United States Patent [19]

Carter et al.

[11] 4,088,603
[45] May 9, 1978

[54] CATALYST ACTIVATION PROCESS

[75] Inventors: James L. Carter, Westfield; John H. Sinfelt, Berkeley Heights, both of N.J.

[73] Assignee: Exxon Research & Engineering Co., Linden, N.J.

[21] Appl. No.: 804,438

[22] Filed: Jun. 7, 1977

Related U.S. Application Data

[63] Continuation-in-part of Ser. No. 654,693, Feb. 2, 1976, abandoned.

[51] Int. Cl.$^2$ .................. B01J 29/00; B01J 29/10; B01J 29/20
[52] U.S. Cl. .................. 252/454; 252/410; 252/459
[58] Field of Search ............... 252/459, 454, 410, 414

[56] References Cited

U.S. PATENT DOCUMENTS

| 2,750,261 | 6/1956 | Ipatieff et al. | 252/452 X |
|---|---|---|---|
| 3,173,881 | 3/1965 | Schoofs | 252/414 X |
| 3,670,041 | 6/1972 | Juhl et al. | 252/414 X |
| 3,696,026 | 10/1972 | Conner et al. | 252/414 X |
| 3,868,332 | 2/1975 | Carter et al. | 252/452 |

FOREIGN PATENT DOCUMENTS 1,158,418  7/1969  United Kingdom ............ 252/414

Primary Examiner—Carl F. Dees
Attorney, Agent, or Firm—Albert P. Halluin

[57] ABSTRACT

The instant invention pertains to a process for activating a reducing catalyst comprising the steps: (a) reducing said catalyst by heating the catalyst in the presence of hydrogen at a temperature sufficient to partially active catalyst; (b) contacting said partially active catalyst in the presence of hydrogen with a reactant feed which undergoes an exothermic reaction in the presence of said partially activated catalyst at conditions whereby said reaction occurs, said conditions including a temperature at least greater than the temperature at which the catalyst is partially activated; and (c) continuing said contacting for a time sufficient to convert said partially activated catalyst to a high activity catalyst. The catalyst is preferably a massive nickel catalyst comprised of nickel and silica, and more preferably comprised of nickel, copper and silica, and capable of having a reduced nickel surface area ranging from 55 to 100 m$^2$/g and a B.E.T. total surface area ranging from 150 to 300 m$^2$/g.

24 Claims, No Drawings

CATALYST ACTIVATION PROCESS

CROSS REFERENCE TO RELATED APPLICATIONS

This application is a continuation-in-part of U.S. application Ser. No. 654,693, filed Feb. 2, 1976 and now abandoned.

BACKGROUND OF THE INVENTION

1. Field of the Invention

This invention relates to a process for activating catalysts which are commonly activated by reduction at elevated temperatures. In one embodiment, it relates to a process for activating nickel containing catalysts at temperatures lower than commonly employed for activation by a sequence of steps which includes the use of a reactive feed. In another embodiment, it relates to a method for activating massive nickel containing catalysts, particularly massive nickel-silica containing catalysts which also include copper and capable of having a reduced nickel surface area ranging from about 55 to about 100 $m^2/g$ and a B.E.T. total surface area ranging from about 150 to about 300 $m^2/g$.

Many commercial hydrogenation units are limited to a maximum temperature at the inlet of about 200° to about 250° C. Since many reducing catalysts such as the nickel-silica catalysts must be reduced at temperatures of at least about 350° C. for complete activation, it has been the practice to include a preheater furnace on commercial hydrogenation units to preheat the feed inlet to temperatures ranging from 350° to 400° C. The hydrogenation units which do not include preheaters require the use of the more expensive preactivated catalysts.

2. Description of the Prior Art

U.S. Pat. No. 3,173,388 to Schoofs described a process for recovering active catalytic material from an aluminum halide-hydrocarbon sludge. The aluminum halides (aluminum halide hydrocarbon complexes) described in the Schoofs patent are used in a Friedel-Crafts type process. The aluminum halide hydrocarbon complexes are gradually converted to a heavy aluminum halide-hydrocarbon sludge which decreases or eliminates the catalytic activity of the catalyst. Patentee teaches regeneration of this catalyst by treating the "sludge" with hydrogen at elevated temperatures and adding cracking hydrocarbons to the catalytic mixture to cause exothermic hydrocracking of the conjunct polymer.

U.S. Pat. No. 3,670,941 to Juhl et al discloses a process for the selective hydrogenation of olefinic unsaturated impurities present in aromatic hydrocarbon feed and subsequently regenerating the catalyst with hydrogen and a hydrocarbon liquid at elevated temperatures. Thereafter the regenerated catalyst is contacted with additional quantities of the aromatic hydrocarbon feed.

U.S. Pat. No. 3,696,026 to Conner et al discloses a method for activating a hydrocarbon cracking catalyst by reducing and sulfiding steps which preclude the necessity of removing water from the system.

British patent specification No. 1,158,418 discloses a process for reactivating Group VIII metal-containing catalysts by washing with an inert liquid hydrocarbon at a temperature below 200° C., and then in a second step, washing with a stream of hydrogen at a temperature between 200°–500° C.

The prior art cited and described above does not pertain to the activation of reducing catalysts as provided by the process of the present invention. With the exception of the Conner et al patent, the above-cited patents pertains to either reactivation or regeneration processes. None of the above-cited patents pertain to the activation of reducing catalysts.

Massive nickel hydrogenation catalysts having a nickel surface area of more than 70 $m^2/g$ are described in U.S. Pat. No. 3,697,445 to Carter. U.S. Pat. No. 3,868,332 teaches such a catalyst characterized as having a low sodium content, i.e., less than 0.2 wt. % based on total weight of catalyst. In U.S. Pat. No. 3,859,370 the use of this catalyst in hydrogenation processes is claimed.

U.S. application Ser. No. 577,328, filed May 14, 1975 in the names of James L. Carter and Allan E. Barnett discloses and claims a massive nickel catalyst wherein an improved activation is obtained by the incorporation of copper along with the nickel into the catalyst. The use of copper in the massive nickel catalyst enables one to activate the catalyst by reduction in hydrogen at lower temperatures. The temperatures disclosed and claimed include a range from 75° to about 400° C. An important difference between the catalyst activation procedure of the present invention and that of U.S. application Ser. No. 577,328 is that the present process requires two steps, one of which includes a reactive feed. By carrying out these sequential two steps within the limits defined and claimed herein a higher activity catalyst is obtained at lower temperatures.

DISCOVERY OF THE PRESENT INVENTION

It has now been discovered that reducing catalysts can be activated by an in situ technique. This technique, in its essential elements, comprises the sequential steps of heating the catalyst under reducing conditions to a temperature below about 235° C. to partially activate the catalyst and thereafter carry out a reaction which is exothermic to fully activate the catalyst.

The process of the present invention reduces possible capital expense in eliminating the need for preheater furnaces in some processes and it also enables one to obtain higher conversions than the prior art one-step activation procedures.

SUMMARY OF THE PRESENT INVENTION

This invention relates to a process for the activation of catalysts which are activated at elevated temperatures in the presence of a reducing gas by a sequence of steps which includes the use of a reactive feed. Preferably, the process of the present invention relates to a process for activating nickel-silica catalysts which contain only very minor amounts of alkaline impurities, more preferably, the nickel-silica catalyst are massive nickel catalysts as described in U.S. Pat. Nos. 3,697,445 and 3,868,332. Especially preferred catalysts to be activated by the process of the present invention are massive nickel containing catalysts which also include copper and capable of having a reduced nickel surface area preferably ranging from about 55 to about 100 $m^2/g$, and more preferably ranging from about 70 to about 100 $m^2/g$ and a B.E.T. total surface area ranging from about 150 to about 300 $m^2/g$. The latter catalysts are disclosed in U.S. application Ser. No. 577,328, filed May 14, 1975, the disclosure of which is incorporated herein by reference for the purpose of teaching the preferred methods of preparation (excluding, of course, the activation step) and chemical identity of catalysts.

The instant invention relates to an improved method for activating catalysts which are commonly activated by reduction at elevated temperatures, for example, at least 150° C. The catalyst prior to this activation step may be prepared by any method known in the art. For example, in preparing a supported catalyst which comprises a metal supported on an inert, porous support, a catalyst metal precursor will be impregnated or precipitated onto the support or, alternatively, the supported catalyst may be formed by coprecipitation, from solution, of the precursors of both the metal and the support. The solution may comprise any solvent in which the catalyst metal precursors are soluble, i.e., the solvent may be aqueous or nonaqueous. The excess solvent will be removed by methods known in the art, including heating and/or use of a vacuum. After solvent removal, if desirable, a calcination in air or an inert gas may be carried out.

The improved process of the instant invention is especially suitable for preparing hydrogenation catalysts which are activated by reduction at high temperature. Most especially, the process of the instant invention is useful for activating the massive nickel hydrogenation catalysts described in the above patents and patent applications which have been incorporated herein by reference. In its most preferred embodiment, the process of the instant invention is utilized to activate the catalysts taught in U.S. Ser. No. 577,328 which comprise nickel, copper and silica coprecipitated onto a porous support. Thus, the most preferred catalysts for activation by means of the process of the instant invention are prepared prior to the activation step as disclosed in said patent application (see especially page 4, line 19, through page 6, line 11). The activation of these specific catalysts is further described hereinbelow. However, it is to be noted that this description is for purposes of example only and the process of the instant invention is related to the preparation of any catalyst wherein activation is effected by reducing at elevated temperatures, especially where the reduction is carried out in a unit wherein there is a limit to the temperature that may be obtained.

DESCRIPTION OF THE PREFERRED EMBODIMENTS

The present invention specifically pertains to a process for activating a reducing catalyst comprising the sequential steps:

(a) reducing said catalyst by heating the catalyst in the presence of hydrogen at a temperature sufficient to partially activate the catalyst;

(b) contacting said partially active catalyst in the presence of hydrogen with a reactant feed which undergoes an exothermic reaction in the presence of said partially activated catalyst at conditions whereby said reaction occurs, said conditions including temperatures at least greater than the temperatures at which the catalyst is partially activated; and (c) continuing said contacting for a time sufficient to convert said partially activated catalyst to a high activity catalyst.

In one preferred embodiment, the importance of the instant invention resides in the fact that many commercial hydrogenation units are limited to a maximum temperature at the inlet of about 200° C. to 250° C. It is noted that there are commercial hydrogenation units wherein a furnace is used to preheat the feed at the inlet, however these units must be designed for temperatures of from 350° C. to 400° C., since most commercial nickel-silica catalysts must be reduced at temperatures of at least about 350° C. for complete activation. Thus the catalyst is generally reduced and stabilized by the manufacturer. This requirement, however, increases the cost of the catalyst and makes in situ activation more attractive. Because of the above limitation on inlet temperatures, prior to the discovery of the process of the present invention, in situ techniques were not commonly available to the commercial users of nickel-silica hydrogenation catalysts.

In a particularly preferred aspect of the invention, the catalyst to be activated by the process of the present invention may be prepared as follows:

The catalyst is prepared by precipitating nickel and silicate ions from solution as nickel oxide, nickel carbonate and nickel hydroxide onto porous silica particles such as Kieselguhr, for example, in such proportions, that the activated catalyst contains 25 to 50 wt. % nickel and under conditions of dilution, such that high concentrations of dissolved nickel are never present in solution with dissolved silicate. Of its total silica content, 30 to 90 wt. % thereof is derived from the precipitated silicate ions. (For a more detailed description of the preparation of the massive nickel catalyst described above, reference is made to U.S. Pat. Nos. 3,697,445 and 3,868,332. These patents, as mentioned hereinabove, disclose massive nickel silica catalysts having a nickel surface area greater than 70 m$^2$/g of catalyst). The recovered massive nickel catalyst may be prepared for activation by calcining in air the particles of porous silica and their associated deposit of nickel oxide, nickel carbonate and nickel hydroxide at a temperature in the range of from about 300° to 450° C. Following calcination of the catalyst, the catalyst may be activated in accordance with the teachings of the present invention.

In another modification of this same system, a copper promotion is instituted and these copper promoted massive nickel catalysts are prepared as follows: Two solutions, one containing copper and nickel cations and the other containing the silicate anion, with porous silica particles slurried therein, are comingled at a slow rate to effect maximum mixing. Typically, the nickel and copper nitrate solution would be added to a sodium meta silicate solution, containing porous silica particles, uniformly over approximately a 5 to 40 minute period. The mixture is then heated to the boiling point and coprecipitation of copper, nickel and silicate ions must be completed. This may be effected by various methods known in the art, but it is most preferred that the coprecipitation of copper, nickel and silicate ions in aqueous solution containing the solid carrier particles be completed by addition of a water soluble alkaline precipitating compound such as ammonium bicarbonate. The alkaline ammonium precipitants are most suitable for minimizing the amount of alkali metal residue which has to be removed by washing to avoid poisoning action on the finished catalyst. Following the precipitation, the mixture is maintained at the boiling point for about 1 to 5 hours; then it is filtered and washed four times with boiling water. The precipitated catalyst is then dried by heating for about 1 to 5 hours at a temperature of 90° to 200° C. It is then calcined by heating in the presence of an oxygen-containing gas or air to a temperature in the range of 300° to 450° C. for a period of 2 to 8 hours, preferably 3 to 5 hours. (A more detailed description of this copper promoted massive nickel catalyst and its preparation is provided in U.S. application Ser. No. 577,328, now abandoned and already incorporated herein by reference.) The calcined copper promoted massive nickel catalyst prepared in the manner described above may then be activated by the process of the present invention.

Specifically, a preferred process of the present invention for the activation of the massive nickel reducing catalyst comprising copper, nickel and silica which is characterized as capable of having a reduced nickel surface area ranging from 55 to about 100 m$^2$/g and a B.E.T. total surface area ranging from 150 to about 300 m$^2$/g comprises the following sequential steps:

(a) reducing said catalyst by heating the catalysts in increments in the presence of hydrogen until said catalyst attains temperatures ranging from about 210° to less than about 235° C. and maintaining said temperatures for a time sufficient to yield a partially activated catalyst;

(b) contacting said partially active catalyst in the presence of hydrogen with a reactant feed which undergoes an exothermic reaction in the presence of said partially activated catalyst at conditions including temperatures ranging from about 235° to about 275° C., whereby the temperature at the catalyst surface exceeds the temperature of the catalyst bed; and (c) continuing said contacting for a time sufficient to convert said partially activated catalyst to a high activity catalyst.

Preferably, the above activated massive nickel catalyst is prepared by contacting a porous support with a solution of nickel, copper and silicate ions at conditions whereby said ions are coprecipitated onto said support to yield a composite comprising nickel, copper and silica precursors supported on said porous support. The porous support is preferably a particulate type support, such as silica or kieselguhr.

In a preferred embodiment, the process of the present invention pertains to the activation of the massive nickel catalyst, having a high nickel surface area. The catalyst preferably contains copper. The catalyst is charged into the hydrogenation reactor at atmospheric temperatures in a manner designed to minimize absorption of water from the atmosphere. The reactor may be purged with dry air or a dry inert gas to remove traces of water from both the reactor and the catalyst. The reactor is closed and then purged with an inert gas to remove oxygen. When the oxygen level is sufficiently low, i.e., less than 1%, the purge gas is terminated and a reducing gas, preferably a hydrogen-rich gas is passed over the catalyst at a flow rate of from 1,000 V/Hr/V to 50,000 V/Hr/V, preferably 5000 V/Hr/V. The reducing gas is bled into the reactor with steadily increasing flow up until the point where full flow has been obtained and the reactor pressure has reached normal operating level. Then the temperature at the inlet is increased from ambient temperatures in increments of 10° C. to 30° C. at 30 minute intervals until a temperature of from 210° to less than 235° C. is achieved within the catalyst bed. This temperature is maintained for a time sufficient to provide a partially activated catalyst composite, i.e., with 10–75% of the activity of a fully activated catalyst. The catalyst at this point is an active catalyst, although, due to the fact that much of the nickel exists in the non-metallic (noncatalytically active) state, the catalyst is characterized as being partially activated. However, as will be further described below, it is critical that sufficient nickel exist in the metallic, i.e., catalytically active state to yield a composite having some catalytic activity. The temperature at the inlet is then lowered to a temperature ranging from about 100° C. to about 125° C. and the flow of a reactive feed through the catalyst bed is commenced. The reactive feed when a hydrogenation catalyst is being activated by the process of the instant invention is conveniently an unsaturated hydrocarbon, i.e., either an aromatic or olefinic hydrocarbon, or oxygenated derivatives thereof, e.g. alcohols, ethers, etc. Examples of reactive feed which are useful in the process of the instant invention include: $C_2$ to $C_{20}$ olefins, $C_6$ to $C_{20}$ aromatics hydrocarbons, e.g. benzene, toluene, xylenes, hexene, butadiene, styrene, etc. The reactive feed may be 100% olefinic or aromatic or comprise mixtures of olefins and aromatics. Non-reactive components such as paraffins may also make up a portion of the reaction feedstream. Hydrogen is provided with the reactive feed since it is necessary as a reactant to reduce the nickel to the metal. It is critical to the process of the instant invention that the reaction used to activate the partially activated catalyst composite must be exothermic since the purpose in contacting the catalyst with a reactive feed, at this point, is to utilize the heat of reaction to obtain a higher temperature at the surface of the catalyst than is available at the inlet or in the catalyst bed. Thus, the skilled artisan would adjust the reactive feed accordingly to obtain sufficient heat of reaction to convert the partially activated catalyst into a high activity catalyst, i.e., a catalyst with more than 75% of the activity of a fully activated catalyst.

The temperature during the contacting of the partially activated massive nickel hydrogenation catalyst with the reactive feed is raised, in increments of 10° C. to 30° C. per 30 minute interval, until the maximum temperature in the catalyst bed exceeds 235° C., preferably the temperature is raised to between 235° C. and 275° C.

The ratio of the reactive feed to hydrogen and flow rates of both are adjusted to achieve a sufficient exotherm to raise the temperature of the catalyst in the bed to a level of about 250°–275° C. or more. The catalyst will be maintained at this temperature by means of the reaction occurring for a time sufficient to achieve, preferably full, i.e., 100%, activation of the catalyst, approximately 2 to 20 hours.

The massive nickel catalysts activated by the process of the instant invention are useful in hydrogenation and may be used to hydrogenate aromatics, aldehydes, alcohols, olefins, including both straight and branched chain, and the various hydrocarbon double bonds found in edible fats and oils.

The following examples serve to more fully describe the manner of making and using the above-described invention, as well as to set forth the best modes contemplated for carrying out various aspects of the invention. It is to be understood that these examples in no way serve to limit the true scope of this invention, but rather, are presented for illustrative purposes only. It will be understood that all proportions are in parts by weight, unless otherwise indicated:

EXAMPLE 1

The following examples best illustrate the process of the instant invention as compared to prior art processes. The catalyst used in all the tests was prepared according to the method given in Example 1 of U.S. patent application Ser. No. 577,328, and contained by weight 45.0% nickel, 5.0% copper, and 50% silica (the impurities present in the acid washed kieselguhr being included in the weight of silica given).

In Example A the catalyst was activated in H₂ at a catalyst bed temperature of 245° C., with a nonreactive feed flow. In Example B, the catalyst was activated in H₂, at a catalyst bed temperature of 245° C., with a reactive feed which contained 22.3% aromatics. In Example C, the catalyst was activated in H₂, at a catalyst bed temperature of 245° C. with a reactive feed which contained 21.7% aromatics. In Example D the catalyst was activated first with H₂ at a catalyst bed temperature of 232° C., the catalyst bed was then cooled to 121° C. and a flow of reactive feed which contained 21.7% aromatics was introduced along with the H₂. The catalyst was then further activated at 245° C. with reactive feed.

TABLE I

|  | Exam. A | Exam. B |
|---|---|---|
| Conversion of aromatics at 100 hours on oil | 60% | 80% |
| Run Conditions: | | |
| Space Velocity | 10 Volume Feed/Hr/Vol. Catalyst | |
| Pressure | 600 psig | |
| Temperature | 160° C. | |
| H₂ | 1000 Standard Cubic Feet/Barrel | |
| Feed | Mineral spirits* 22.3% aromatics | |

TABLE II

|  | Exam. C | Exam. D |
|---|---|---|
| Conversion of aromatics at 75 hours on oil | 24% | 34% |
| Run Conditions: | | |
| Space Velocity | 30 Volume Feed/Hr/Vol. catalyst | |
| Pressure | 600 psig | |
| Temperature | 160° C. | |
| H₂ | 1000 Standard Cubic Feet/Barrel | |
| Feed | Mineral spirits* 21.7% aromatics | |

*The mineral spirits used was VARSOL™#1, from Exxon Chem. Co., U.S.A., which is a naphtha fraction with a boiling range of 313° F. to 341° F., aromatics content of from about 21 to 23% on a weight basis with about 1.5 ppm sulfur or less.

In Table I, Example B shows significantly higher conversion than Example A. The data in Table II show the added improvement obtained by the activation procedure described in this application. Example D shows substantially more conversion than Example C which did not include a treatment with H₂ prior to the high temperature activation with the reactive feed. Thus, the data in Table I and II demonstrate the criticality of the two step activation process of the instant invention.

It should be noted, for purposes of definition, Example D represents a fully active catalyst composite, while Examples A, B and C, represent partially active catalyst composites, i.e., they have an activity, (as measured by the reaction described in Example D and defining the catalyst activity of said catalyst composite as 100%) of from 10 to 75%.

EXAMPLE 2

In this example, a catalyst prepared in the manner described in Example 1 of U.S. patent application Ser. No. 577,328 (except that the catalyst was washed continuously and was dried in a commercial calciner) was charged into a large scale reactor and activated in the following manner. The reactor was purged with N₂ then the pressure increased to 250 psig, the hydrogen flow was started and the temperature of the catalyst bed was raised from 30° F. (−1° C.) to 445° F. (229° C.) over a 5 hour period while simultaneously increasing the reactor pressure to 500 psig. The temperature was maintained at 445° F. for 8 hours. The temperature was then reduced to 250° F. (121° C.) and the reactive feed (tetrapropylene) was introduced along with the hydrogen feed and liquid recycle of reaction product. The temperature, at the inlet of the reactor, was 250° F. (121° C.) and rose as it passed through the reactor to 355° F. (179° C.) at the outlet. The temperature of the inlet feed was increased, at this time, to 386° F. (197° C.) and the corresponding outlet temperature was 476° F. (247° C.). The flows were continued at these conditions for 12 hours then the inlet temperature was lowered to normal start of run temperature and the catalyst was assayed to possess high activity.

EXAMPLE 3

In this example a catalyst as prepared in the manner described in Example 2 above, was charged to a large scale reactor and activated in the following manner. The reactor was purged with nitrogen pressurized to 300 psig then the hydrogen flow was started and the temperature of the catalyst bed was raised from 55° F. (13° C.) to 437° F. (225° C.) over an 8 hour period. The temperature was maintained at this level for 6 hours. It was then reduced to 273° F (134° C.) and the reactive feed (white spirits) was introduced along with the hydrogen feed and liquid recycle of reaction product. The temperature, at the inlet of the reactor, was 282° F. (139° C.) and rose as it passed through the reactor to 302° F. (150° C.). The temperature of the inlet feed was increased, at this time, to 385° F. (196° C.) and the corresponding temperature at the outlet was 446° F. (230° C.). The flows were continued at these conditions for 7 hours then the inlet temperature was lowered to normal start of run temperature and the catalyst was assayed as having a high activity.

The catalysts activated by the procedures in Examples 2 and 3 were successfully used in hydrogenating aromatic and olefinic feed stocks in accordance with known procedures.

GENERAL

As described hereinabove, the preferred catalysts to be activated by the process of the invention are massive nickel catalysts, and more preferably the copper promoted massive nickel catalysts. The latter type of catalysts are characterized as being capable of having a reduced nickel surface area ranging from about 55 to 100 m²/g and a B.E.T. total surface area ranging from about 150 to about 300 m²/g. The reduced nickel surface area of both types of catalysts is determined by hydrogen chemisorption wherein the catalyst has been reduced with hydrogen at 400° C. The procedure used to determine the hydrogen chemisorption is described by D. J. F. Yates, W. F. Taylor and J. H. Sinfelt, *J. Am Chem Soc.*, 86, 2996–3001 (1964). As in the case of the copper-nickel alloys described by J. H. Sinfelt, J. L. Carter and D. J. C. Yates, *J. of Catalysis*, 24, 283–296 (1972), the copper tends to concentrate in the surface of the copper promoted massive nickel catalyst. This in effect reduces the surface area on which the hydrogen can be absorbed by the hydrogen chemisorption test. X-ray diffraction analysis by line broadening has revealed, however, that the crystallite sizes of the nickel in the copper promoted massive nickel catalyst is substantially the same as the massive nickel catalysts which have not been promoted by the copper. It has been found that in either case the nickel crystallites for both catalysts as determined by x-ray diffraction by line broadening ranges from about 10 to 50 A preferably from 15 to 30 A in size. Typically, these catalysts have nickel crystallites of 20-21 A in size. The crystallites in the massive nickel catalysts are smaller than the crystallites in similar commercially available nickel catalysts. The smaller the crystallites the larger the number of surface atoms available for hydrogen chemisorption.

It will be understood that the reactive feed used in the practice of the invention will be substantially free of contaminants which tend to inactivate the catalyst, e.g., sulfur.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for activating a reducing catalyst comprising the sequential steps:
   (a) reducing said catalyst by heating the catalyst in the presence of hydrogen at a temperature sufficient to partially activate the catalyst;
   (b) contacting said partially active catalyst in the presence of hydrogen with a reactant feed which undergoes an exothermic reaction in the presence of said partially activated catalyst at conditions whereby said reaction occurs, said conditions including temperatures at least greater than the temperatures at which the catalyst is partially activated; and
   (c) continuing said contacting for a time sufficient to convert said partially activated catalyst to a high activity catalyst.

2. The process of claim 1 wherein the heating in step (a) is in the range from about 210° to less than about 235° C.

3. The process of claim 1 wherein said reducing catalyst is comprised of nickel.

4. The process of claim 1 wherein said reducing catalyst is comprised of nickel and silica.

5. The process of claim 1 wherein said reducing catalyst is comprised of nickel and silica and capable of having a reduced nickel surface area ranging from 55 to about 100 m²/g and a B.E.T. total surface area ranging from 150 to about 300 m²/g.

6. The process of claim 5 wherein said catalyst additionally includes copper.

7. The process of claim 1 wherein said reactant feed comprises an unsaturated hydrocarbon or oxygenated derivative thereof.

8. The process of claim 7 wherein said unsaturated hydrocarbon is a $C_6$ to $C_{20}$ aromatic hydrocarbon.

9. The process of claim 7 wherein said unsaturated hydrocarbon is a $C_2$ to $C_{20}$ olefinic hydrocarbon.

10. A process for activating a reducing catalyst comprised of nickel and silica and capable of having a reduced nickel surface area ranging from about 55 to about 100 m²/g and a total surface area ranging from about 150 to about 300 m²/g, comprising the steps:
    (a) reducing the catalyst by heating the catalyst in increments in the presence of hydrogen at a temperature sufficient to partially activate the catalyst;
    (b) contacting said partially active catalyst in the presence of hydrogen with a reactant feed which undergoes an exothermic reaction in the presence of said partially activated catalyst at conditions whereby said reaction occurs, said conditions including a temperature ranging from about 235° to about 275° C.; and
    (c) continuing said contacting for a time sufficient to convert said partially activated catalyst to a high activity catalyst.

11. The process of claim 10 wherein said heating in step (a) is conducted until a temperature in the range from about 210° to less than about 235° C. is attained.

12. The process of claim 10 wherein said catalyst additionally includes copper.

13. The process of claim 10 wherein said reactant feed comprises an unsaturated hydrocarbon or oxygenated derivative thereof.

14. The process of claim 13 wherein said unsaturated hydrocarbon is a $C_6$ to $C_{20}$ aromatic hydrocarbon.

15. The process of claim 13 wherein said unsaturated hydrocarbon is $C_2$ to $C_{20}$ olefinic hydrocarbon.

16. A process for activating a massive nickel reducing catalyst, said catalyst comprising copper, nickel and silica, and said catalyst being characterized as capable of having a reduced nickel surface area ranging from 55 to about 100 m²/g and a B.E.T. total surface area ranging from 150 to about 300 m²/g, comprising the steps:
    (a) reducing said catalyst by heating the catalyst in increments in the presence of hydrogen until said catalyst attains temperatures ranging from about 210° to less than about 235° C. and maintaining said temperatures for a time sufficient to yield a partially activated catalyst;
    (b) contacting said partially active catalyst in the presence of hydrogen with a reactant feed which undergoes an exothermic reaction in the presence of said partially activated catalyst at conditions whereby said reaction occurs, said conditions including temperatures ranging from about 235° C. to about 275° C., whereby the temperatures at the catalyst surface exceeds the temperature of the catalyst bed; and
    (c) continuing said contacting for a time sufficient to convert said partially activated catalyst to a high activity catalyst.

17. The process of claim 16 wherein said catalyst is prepared by contacting a porous support with a solution of nickel, copper and silicate ions at conditions whereby said ions are coprecipitated onto said support to yield a composite comprising nickel, copper and silica precursors supported on said porous support.

18. The process of claim 17 wherein said porous support is a particulate support.

19. The process of claim 18 wherein said support is selected from the group consisting of silica and kieselguhr.

20. The process of claim 18 wherein said feed comprises an unsaturated hydrocarbon or oxygenated derivative thereof.

21. The process of claim 20 wherein said unsaturated hydrocarbon is a $C_6$ to $C_{20}$ aromatic hydrocarbon.

22. The process of claim 20 wherein said unsaturated hydrocarbon is $C_2$ to $C_{20}$ olefinic hydrocarbon.

23. The process of claim 18 wherein said (a) is continued at temperatures ranging from about 210° C. to less than about 235° C. for a time sufficient to yield a catalyst having an activity ranging from 10 to 75% of the fully activated catalyst.

24. The process of claim 23 wherein step (b) is carried out at conditions sufficient to yield a catalyst with an activity of greater than 75% of the fully activated catalyst.

* * * * *